United States Patent [19]

Plescia

[11] 3,879,872

[45] Apr. 29, 1975

[54] MICROFICHE HOLDER

[75] Inventor: Ronald Earl Plescia, San Jose, Calif.

[73] Assignee: Quantor Corporation, Mountain View, Calif.

[22] Filed: Dec. 26, 1973

[21] Appl. No.: 427,759

[52] U.S. Cl. .............. 40/104.03; 40/124.2; 40/159; 281/33

[51] Int. Cl. .......................... B42f 15/00; G09f 7/00

[58] Field of Search ....... 40/104.03, 104.17–104.19, 40/142 A, 124.1, 152.1, 159, 124.2, 120; 281/29, 33

[56] References Cited

UNITED STATES PATENTS

| | | | |
|---|---|---|---|
| 2,226,976 | 12/1940 | Leaming | 40/104.19 |
| 3,166,342 | 1/1965 | Yerkes | 281/33 |
| 3,466,774 | 9/1969 | Borresen | 40/159 X |

*Primary Examiner*—Robert W. Michell
*Assistant Examiner*—John H. Wolff
*Attorney, Agent, or Firm*—Townsend and Townsend

[57] ABSTRACT

A holder for storing and displaying a plurality of fiches adjacent a microfiche reader. The holder includes two rectangular members hingeably attached along corresponding lateral edges. The members are mutually rotatable about the attached edges so that the front face of one of the members is placeable in abutment with the front face of the other member when the members are folded. A plurality of overlying stacked pockets are provided on the front face of the one rectangular member and are adapted to contain the plurality of fiches. The overlying stacked pockets expose the top edge of each of the fiches when the members are unfolded. A magnet is fixed to the front face of the other rectangular member, and means are provided for releasably interconnecting the back faces of the two members when they are unfolded so that attachment of the magnet to the side of the microfiche reader mounts the fiches by the reader for use.

7 Claims, 3 Drawing Figures

MICROFICHE HOLDER

BACKGROUND OF THE INVENTION

The present invention relates to microfiche devices, and in particular to a folder for carrying and displaying a plurality of fiches.

The use of microfiche and microfiche readers for storing and displaying printed information has become quite common. Many pages of a document can be stored on one rectangular film or fiche and a special reader is used to display each of the pages individually.

Since the primary object of using microfiche is to minimize the space required for storage, such fiche are provided with only a small border of film surrounding the data, and are not encased in a frame or similar device. When handling the film, the user ordinarily grasps the part of the film which actually carries the data, and such handling eventually results in finger printing and smearing of the film. Also, the fiche are quite thin and when several fiche are provided in a stack, finding the particular fiche desired can be quite difficult. In addition, no method is usually provided for combining series of fiche which contain data from a single large document or sets of documents. The fiche are ordinarily stored individually, and when the use of one or more fiches is desired, the fiche or fishes is merely removed from the file, placed in a pile and carried to the reader.

SUMMARY OF THE INVENTION

The present invention provides a folder which allows for the carrying of a plurality of fiches without directly handling them and for conveniently mounting and displaying the fiches adjacent a microfiche reader. The holder includes two rectangular members hingeably attached so that the members can be folded to overlay the respective inside or front faces of the two members. A plurality of stacked pockets on the inside face of one rectangular member store and expose the top edge of each fiche so that their identifying marks or titles are visible. A magnet is fixed to the inside face of the other rectangular member to attach that member to the side of the microfiche reader when the members are unfolded, providing a user of the reader with ready access to the displayed fiches. The present invention solves many of the difficulties previously associated with the storage and handling of microfiche. Related fiches, such as several fiches containing a single document, can be contained in a single folder for storage, and the folder protects the fiches while they are being stored. When the fiches are to be used, a minimum of handling of each particular fiche is required, since each of the fiches is individually displayed to the user thereof. Furthermore, attachment of the folder to the side of a reader provides a convenient means for displaying a plurality of fiches to a user, and he need not sort through a stack of fiches each time he wishes to read a new one. Since only the top edges of the fiches are exposed, they can only be drawn out of the holder by grasping that top edge which discourages handling of the data-carrying area of the fiche.

The holder of the present invention folds up like a book for storage of the fiches in the holder. In this configuration the holder requires little space, and a large number of such holders with the fiches therein can be stored on a single shelf. The tab and flap fold against the holder and do not protrude when the folder is in storage. Hence, the holder can be conveniently used for permanent storage of the fiches, and takes up little space other than that required for storage of the fiches themselves.

The novel features which are characteristic of the invention, both as to organization and method of operation, together with further objects and advantages thereof will be better understood from the following description considered in connection with the accompanying drawings in which a preferred embodiment of the invention is illustrated by way of example. It is to be expressly understood however, that the drawings are for the purpose of illustration and description only and are not intended as a definition of limits of the invention.

BRIEF DESCRIPTION OF THE PREFERRED EMBODIMENT

Figure 1:
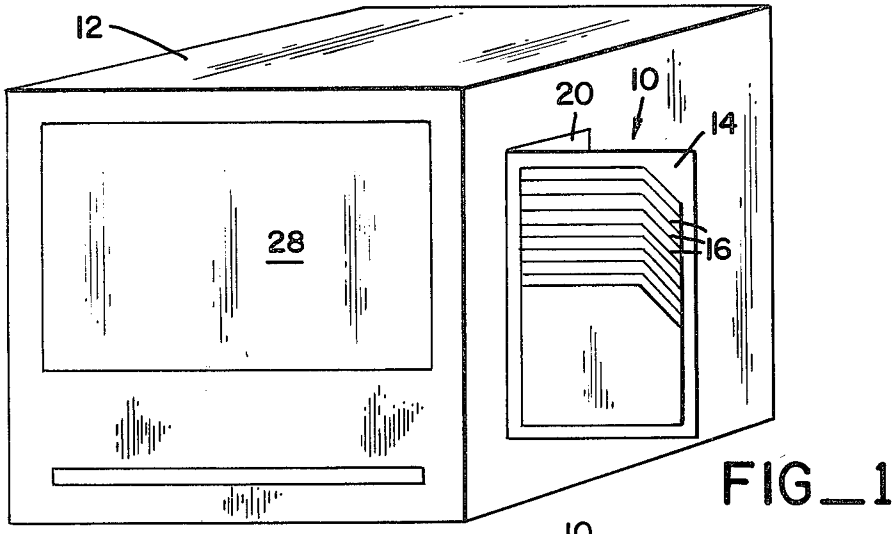
FIG. 1 is a perspective view of a microfiche reader having the apparatus of the present invention attached thereto.
Figure 2:
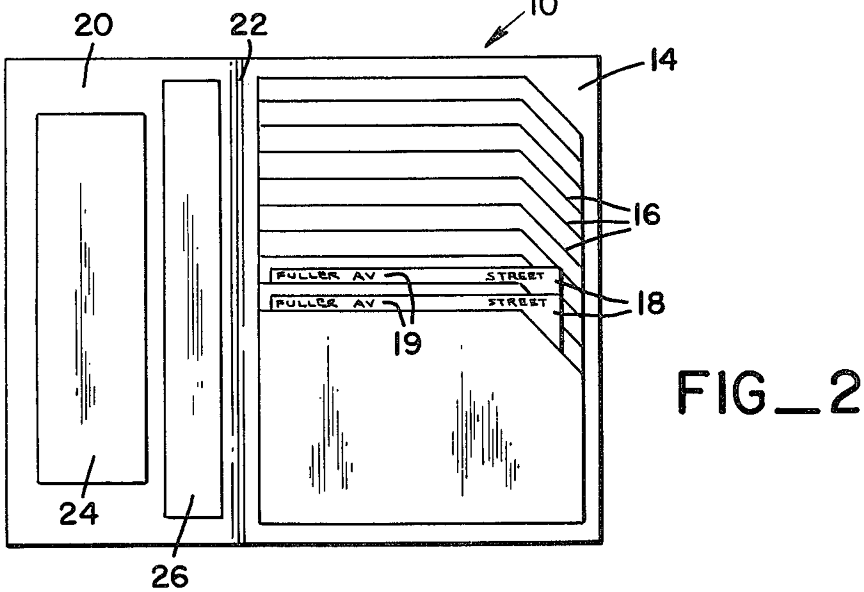
FIG. 2 is a front elevation view of the apparatus of the present invention when it is unfolded.

The attachment of the folder 10 of the present invention to a standard microfiche reader 12 is illustrated by way of reference to FIG. 1, and the configuration of folder 10 is illustrated by way of reference to FIG. 2. Folder 10 has a first relatively rigid rectangular member 14 which has a plurality of overlying stacked pockets 16 on the inside or front face thereof. A plurality of fiches or films 18 are individually disposed in pockets 16. Since pockets 16 are staggered and overlie one another, the top edge of each of the fiches is exposed. Usually the fiches contain an identifying title such as 19 along the exposed top edge which is easily visible to the user of microfiche reader 12.

A second relatively rigid planar member 20 is hingably attached to member 14 along seam 22. Members 14 and 20 is preferably constructed from a double layer of flexible plastic material having inlaid cardboard for stiffness, and seam 22 can be formed by providing a gap in the cardboard and joining the layers of plastic. Seam 22 allows the inside face of member 20 to be folded and placed in abutment with the inside face of member 14 to provide protection for the stored fiches 18.

The inside face of member 20 has one or more strips of magnetic material 24, 26. When members 14, 20 are unfolded along seam 22 as illustrated in FIG. 1, magnetic strips 24, 26 are placed against the metallic side of microfiche reader 12. Reader 12 has a front viewing screen 28, and a person viewing screen 28 has easy access to the fiches stored in folder 10.

Figure 3:
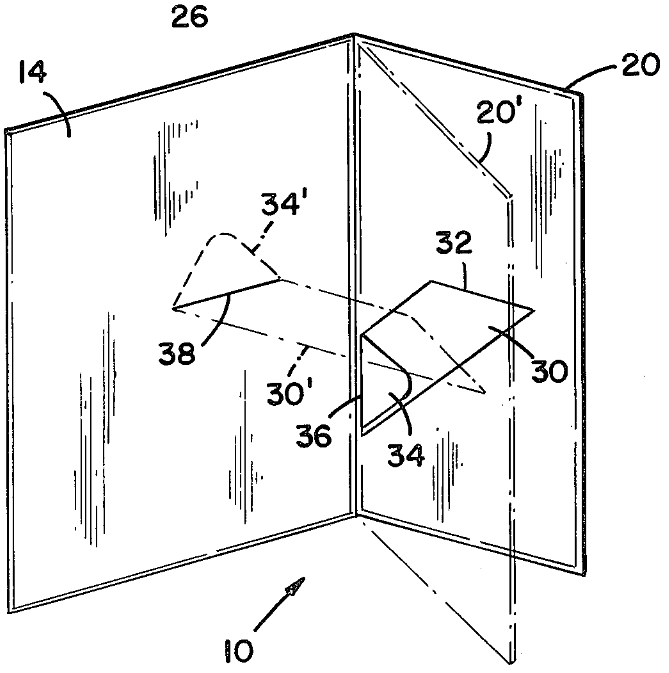
FIG. 3 is a rear perspective view illustrating the attachment of the back faces of the apparatus.

The manner in which folder 10 is maintained in its unfolded position for use is illustrated by way of reference to FIG. 3. The back face of member 20 is provided with an elongate flap 30 joined to the member 20 along seam 32. Flap 30 is normally folded along the back face of member 20 as illustrated at 30, but can be folded upwardly to extend outwardly as illustrated by phantom 30' for use. A tab 34 is provided at the end of elongate flap 30, and is rotable with respect to flap 30 along seam 36. Seam 36 is inclined substantially 45 degrees from the axis of flap 30. When the flap 30 and tab 34 are folded flat for storage, they lie within the perimeter of the back face of member 20 and do not protrude. A slit 38 is provided in the back face of member 14. When members 14, 20 are unfolded substantially 270 ° as illustrated by phantom 20′, seam 36 will coincide with slit 38, and tab 34 can be inserted upwardly through slit 38 as illustrated by phantom 34′. In this manner, folder 10 is locked in the unfolded position.

Since folder 10 is primarily adapted to be mounted on the side of microfiche reader 12, it is considered preferable that members 14, 20 be unfoldable substantially 270 ° so that the inside face of the member 14 will face forwardly. However, it is apparent that members 14, 20 could be unfolded somewhat less than 270 ° in order to incline the front face of member 14 toward the user of reader 12. Also, it is possible that in certain applications, reader 12 may be provided with a lip or other projection parallel to the viewing screen 28 thereof, and members 14, 20 can be unfolded approximately 180 degrees and attached to this projection.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. A folder for carrying a plurality of fiches and mounting the several fiches adjacent a microfiche reader having a metallic portion for use, said holder comprising:

first and second substantially rigid planar members each having at least one lateral edge adjacent to a lateral edge of the other member, said members having inside and back faces and being hingeably attached along said adjacent lateral edges, said members being mutually rotatable about said attached edges so that the inside face of the first member is placeable in abutment with the inside face of the second member when said members are folded;

a plurality of overlying stacked pockets on the inside face of the first member and adapted to contain a plurality of fiches, said overlying stacked pockets being adapted to expose the top edge each of the fiches when the members are unfolded;

a magnet fixed to the inside face of the second member; and means for releasably interconnecting the back faces of the first and second planar members when said members are unfolded approximately 270 ° so that the magnet can be attached to the metallic portion of a microfiche reader and the fiches in the first member are held normal to said portion of the reader

2. A folder as recited in claim 1 wherein the first and second planar members are rectangular.

3. A folder as recited in claim 1 wherein said interconnecting means is adapted to releasably interconnect the back faces of the first and second members when said members are unfolded substantially 270 °.

4. A folder as recited in claim 3 wherein said interconnecting means comprises an elongate flap extendable outwardly from and connected to the back face of the second planar member and a tab attached to the end of the flap, said tab foldable with respect to said flap about an axis inclined substantially 45 ° from the axis of the elongate flap; and wherein the first member includes a slit formed in the second back face thereof, said tab being insertable in said slit to releasably interconnect the back faces of the first and second members when said members are folded substantially 270 °.

5. A folder as recited in claim 4 wherein the elongate flap and the tab are confined within the outer perimeter of the back face of the second planar member when said flap and said tab are folded for storage.

6. A folder as recited in claim 1 wherein the magnet comprises at least one substantially two-dimensional sheet of magnetic material attached to the inside face of the first member.

7. A folder for carrying a plurality of fiches and mounting the several fiches adjacent a microfiche reader, said holder comprising:

first and second substantially planar rectangular members hingeably attached along corresponding lateral edges of the respective rectangular members, each member having an inside face and a back face, said members being mutually rotatable about said attached edges so that the inside face of the first member is placeable in abutment with the inside face of the second member when said members are folded;

a plurality of overlying stacked pockets on the inside face of the first member and adapted to contain a plurality of fiches, said overlying stacked pockets being adapted to expose the top edge of each of the fiches when the rectangular members are unfolded;

a sheet of magnetic material attached to the inside face of the second rectangular member for attachment to the metallic side of a microfiche reader; and means for releasably interconnecting the back faces of the first and second members when said members are unfolded approximately 270 °, said interconnecting means including an elongate flap extendable outwardly from and connected to the back face of the second member, a tab foldably attached to the end of the flap along a seam inclined substantially 45 ° from the longitudinal axis of the elongate flap, and a slit formed in the back face of the first member, said tab being insertable in said slit to releasably interconnect the back faces of the members when said members are unfolded substantially 270 °.

* * * * *